United States Patent
Mowrer et al.

(10) Patent No.: US 8,871,888 B2
(45) Date of Patent: Oct. 28, 2014

(54) ONE-COMPONENT EPOXY COATING COMPOSITIONS

(75) Inventors: Norman R. Mowrer, Cumming, GA (US); Kamlesh Sheth, Suwanee, GA (US)

(73) Assignee: PPG Industries Ohio, Inc, Cleveland, OH (US)

(*) Notice: Subject to any disclaimer, the term of this patent is extended or adjusted under 35 U.S.C. 154(b) by 967 days.

(21) Appl. No.: 12/783,793

(22) Filed: May 20, 2010

(65) Prior Publication Data

US 2010/0297357 A1    Nov. 25, 2010

Related U.S. Application Data

(60) Provisional application No. 61/180,504, filed on May 22, 2009.

(51) Int. Cl.
| | |
|---|---|
| C08G 77/00 | (2006.01) |
| C08G 59/40 | (2006.01) |
| C09D 183/04 | (2006.01) |
| C09D 163/00 | (2006.01) |
| C08G 77/14 | (2006.01) |
| C08G 77/16 | (2006.01) |

(52) U.S. Cl.
CPC ............ C08G 59/4042 (2013.01); *C08G 77/14* (2013.01); *C08G 77/16* (2013.01); *C08G 2650/50* (2013.01); C09D 183/04 (2013.01); C09D 163/00 (2013.01)
USPC ........................ 528/10; 428/447; 427/407.1

(58) Field of Classification Search
None
See application file for complete search history.

(56) References Cited

U.S. PATENT DOCUMENTS

| 6,045,873 | A | 4/2000 | Adachi et al. |
|---|---|---|---|
| 6,444,272 | B1 | 9/2002 | Matsuda et al. |
| 6,881,775 | B2 | 4/2005 | Ddamulira et al. |
| 7,226,981 | B2 | 6/2007 | Fujita et al. |
| 7,351,782 | B2* | 4/2008 | Wakabayashi et al. ......... 528/18 |
| 2004/0236061 | A1 | 11/2004 | Fujita |
| 2006/0058451 | A1 | 3/2006 | Gommans et al. |
| 2007/0213492 | A1 | 9/2007 | Mowrer et al. |

FOREIGN PATENT DOCUMENTS

| EP | 0890594 A1 * | 1/1999 |
|---|---|---|
| EP | 1679329 A1 | 7/2006 |
| JP | 63-273629 | 11/1988 |
| JP | 63-273630 | 11/1988 |
| JP | 05-132541 | 5/1993 |
| JP | 05-271389 | 10/1993 |
| JP | 2000-034337 | 2/2000 |
| JP | 2000-169673 | 6/2000 |
| JP | 2002-179766 | 6/2002 |
| JP | 2003-342518 | 12/2003 |
| JP | 2004-010641 | 1/2004 |
| JP | 2005-002263 | 1/2005 |

OTHER PUBLICATIONS

Database WPI Week 200053 Thomson Scientific, London, GB; AN 2000-567461, XP02603479.*
Database WPI Week 200053 Thomson Scientific, London, GB; AN 2000-567461, XP002603479.

* cited by examiner

*Primary Examiner* — William Phillip Fletcher, III
(74) *Attorney, Agent, or Firm* — Noland Cheung; Diane R. Meyers

(57) ABSTRACT

Disclosed are high solids, one-component, storage stable coating compositions that include an epoxy resin comprising more than one 1,2-epoxy groups per molecule; a hydrocarbon compound having a softening point of from 50° C. to 140° C.; an alkoxy-functional and/or silanol-functional silicone; and a ketimine curing agent comprising a reaction product of reactants comprising a polyalkyldiamine component and a ketone component. Also disclosed are substrates at least partially coated with a coating deposited from such composition and methods for coating substrates with such compositions.

19 Claims, No Drawings

ONE-COMPONENT EPOXY COATING COMPOSITIONS

CROSS REFERENCE TO RELATED APPLICATIONS

The present application claims priority from U.S. Provisional Application No. 61/180,504, filed May 22, 2009, entitled "One-Component Epoxy Coating Compositions", which is herein incorporated by reference.

FIELD OF THE INVENTION

The present invention relates to, among other things, high solids, one-component, storage stable epoxy coating compositions, and related coated substrates, as well as to methods of applying such compositions.

BACKGROUND INFORMATION

Epoxy coatings are desirable in a variety of applications, including industrial maintenance and marine coating applications. Typically, these epoxy coatings are two-component systems consisting of a resin component in one pack and a curative component in another pack; these two components combined just prior to application. In order to provide optimum properties in the coating film, the two components must be combined at the correct blend ratio just prior to application. If an incorrect blend ratio happens to be used, the coating film may exhibit premature rusting, blistering, or other types of coating film failure. This failure usually results in costly removal of the failed coating film and application of a new coating. One-component coating compositions provide a solution to these problems as they require no blending of components, eliminating any chance of errors. Moreover, one-component coating compositions are user-friendly; have virtually unlimited shelf stability; reduce inventory; and reduce costs associated with waste disposal.

Due to environmental concerns regarding use of coatings with high volatile organic content (VOC), it is desirable to provide coating compositions which are high solids, and consequently, low in VOC.

As a result, it would be desirable to provide a one-component epoxy coating composition that is high in solids to provide low VOC, provide good coating properties, such as hot water resistance and corrosion resistance, and maintain good storage stability for long periods of time.

The present invention has been developed in view of the foregoing.

SUMMARY OF THE INVENTION

In certain respects, an exemplary embodiment relates to a high solids, one-component, storage stable coating composition comprising: (a) an epoxy resin comprising more than one 1,2 epoxy groups per molecule; (b) a hydrocarbon compound having a softening point of from 50° C. to 140° C.; (c) an alkoxy-functional and/or silanol-functional silicone; and (d) a ketimine curing agent comprising a reaction product of reactants comprising a polyalkylpolyamine component and a ketone component.

In other exemplary embodiments, the polyalkylpolyamine disclosed above may be polyoxyalkylpolyamine.

In still other exemplary embodiments, the polyoxyalkylpolyamine disclosed above may be polyoxypropylenediamine.

These and other respects will become more apparent from the following description.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to high solids, one-component coating compositions. As used herein, the term "high solids" and like terms refer to those coating compositions having a total solids content of at least 50 percent by weight, such as at least 75 percent by weight, based on the total weight of the coating composition and which can be applied to the substrate by conventional techniques, including, for example, spray, brush, dip, and/or roll techniques. In certain embodiments, the coating compositions of the present invention are low VOC, for example, the VOC of coating compositions of the present invention is less than 500 grams per liter, such as less than 340 grams per liter.

As used herein, the term "one-component" and like terms refer to coating compositions provided in the form of a single component system, wherein all of the coating components are combined and stored in a single container.

As used herein, the term "storage stable" and like terms refer to coating compositions that do not gel or solidify, but rather remain liquid and at viscosities suitable for application of the coating composition over a long period of time, for example, for a period of more than three (3) months at ambient conditions.

In certain embodiments, the coating compositions of the present invention are curable at low temperatures. In other embodiments, the coating compositions are moisture curable. As used herein, the term "low temperature" and like terms refer to coating compositions that, following application to a substrate, are capable of achieving cure at a temperature in the range of −10 to 120° C. (degrees Celsius), such as 5 to 80° C., in some cases 10 to 60° C. and, in yet other cases, 15 to 40° C. In certain embodiments, the coating compositions of the present invention are curable at ambient temperature. As used herein, the term "moisture curable" and like terms refer to coating compositions that, following application to a substrate, are capable of achieving cure in the presence of ambient air, the air having a relative humidity of 10 to 100 percent, such as 25 to 80 percent. As used herein, the term "cure" and like terms refer to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As will also be appreciated by those skilled in the art, the degree of cure can be determined by testing the solvent resistance of a coating to double rubs of methyl ethyl ketone. The higher the number of double rubs with no damage to the coating, the greater degree of cure. In this test, the index finger holding a double thickness of cheesecloth saturated with methyl ethyl ketone is held at a 45° angle to the coating surface. The rub is made with moderate pressure at a rate of 1 double rub per second. As used herein, when it is stated that a coating is "completely cured" it means that the coating is resistant to 100, in some cases 200, double rubs of methyl ethyl ketone according to the foregoing procedure, with no damage to the coating.

As used herein, the term "polymer" is meant to encompass oligomer, and includes, without limitation, both homopolymers and copolymers.

As previously mentioned, in certain embodiments, the coating compositions of the present invention comprise an epoxy resin comprising more than one 1,2-epoxy group per molecule. As used herein, the term "epoxy" refers to compounds comprising epoxy functional groups (i.e. an oxirane ring),

Suitable epoxy resins having more than one 1,2-epoxy group per molecule include, for example, those that are saturated or unsaturated, aliphatic, cycloaliphatic, or heterocyclic. Suitable epoxy resins may be in liquid and/or solid form. In certain embodiments, the epoxy resins are liquid rather than solid and have a molecular weight of from 350 to 4,000, such as from 800 to 2,000. In certain embodiments, the epoxy resins have an epoxide equivalent weight of from 100 to 2,000, such as from 200 to 800; and have a reactivity of two. In certain embodiments, the epoxy resin used can also contain some monomer units having only one oxirane group.

Suitable examples of epoxy resins include, but are not limited to, polyglycidyl ethers of mononuclear polyhydric phenol compounds, such as hydroquinone, resorcin, pyrocatechol, and phloroglucinol; polyglycidyl ethers of polynuclear polyhydric phenol compounds, such as dihydroxynaphthalene, biphenol, methylenebisphenol (i.e., bisphenol F), methylenebis(ortho-cresol), ethylidenebisphenol, isopropylidenebisphenol (i.e., bisphenol A), isopropylidenebis(ortho-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, ortho-cresol novolac, ethylphenol novolac, butylphenol novolac, octylphenol novolac, resorcin novolac, and terpenediphenol; polyglycidyl ethers of ethylene oxide and/or propylene oxide adducts of the above-mentioned mono- or polynuclear polyhydric phenol compounds; polyglycidyl ethers of hydrogenation products of the above-mentioned mononuclear polyhydric phenol compounds; polyglycidyl ethers of polyhydric alcohols, such as ethylene glycol, propylene glycol, butylene glycol, hexanediol, polyglycol, thiodiglycol, glycerol, trimethylolpropane, pentaerythritol, sorbitol, and bisphenol A ethylene oxide adducts; homo- or copolymers of glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic is acid, isophthalic acid, terephthalic acid, trimellitic acid, trimesic acid, pyromellitic acid, tetrahydrophthalic acid, hexahydrophthalic acid, and endomethylenetetrahydrophthalic acid, and glycidyl methacrylate; epoxy compounds having a glycidylamino group, such as N,N-diglycidylaniline and bis(4-(N-methyl-N-glycidylamino)phenyl)methane; epoxy compounds of cyclic olefin compounds, such as vinylcyclohexene diepoxide, dicyclopentanediene diepoxide, 3,4-epoxycyclohexylmethyl-3,4-epoxycyclohexane-carboxylate, 3,4-epoxy-6-methylcyclohexylmethyl-6-methylcyclohexanecarboxylate, and bis(3,4-epoxy-6-methylcyclohexylmethyl)adipate; epoxidized conjugated diene polymers, such as epoxidized polybutadiene and epoxidized styrene-butadiene copolymers; and heterocyclic compounds, such as triglycidyl isocyanurate. In certain embodiments, these epoxy resins may be internally crosslinked by an isocyanate-terminated prepolymer.

Epoxy resins which are suitable for use in the present invention are commercially available and include, but are not limited to, Bisphenol A-epichlorohydrin epoxy resins available from Hexion Specialty Chemicals, Houston, Tex., under the product name EPON, including Epon 1001, Epon 834, and Epon 828; Bisphenol F-epichlorohydrin epoxy resins, available from Hexion Specialty Chemicals under the product name EPON, including Epon 861 and Epon 862; epoxy phenol novolac resins including Epalloy 8250 from CVC located in Cherry Hill, N.J., Araldite EPN 1139 from Ciba Geigy, and DEN432 and DEN438 from Dow Chemical. Suitable non-aromatic epoxy resins are commercially available including but not limited to, for example, hydrogenated cyclohexane dimethanol and diglycidyl ethers of hydrogenated Bisphenol A-type epoxide resin, such as: Epon 1510, Epon 4080E, Heloxy 107 and Epon 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulenc located in Louisville, Ky.; Aroflint 393 and 607 from Reichold located in Pensacola, Fla.; and ERL4221 from Union Carbide located in Tarrytown, N.Y. Other suitable non-aromatic epoxy resins include DER 732 and DER 736.

In certain embodiments, a combination of epoxy resins comprising more than one 1,2-epoxy groups per molecule may be useful in the coating compositions of the present invention.

In certain embodiments, the epoxy resin comprising more than one 1,2-epoxy group per molecule useful in the coating compositions of the present invention is selected from epichlorohydrin-bisphenol A epoxy resins, epichlorohydrin bisphenol F epoxy resins, hydrogenated bisphenol A epichlorohydrin epoxy resins, glycidyl methacrylate resins, glycidyl esters, phenol novalac epoxy resins, resorcinol-modified epoxy resins, and combinations thereof.

In certain embodiments, the epoxy resin comprising more than one 1,2-epoxy group per molecule may be present in the coating compositions of the present invention from 5 to 80 weight percent, such as from 5 to 50 weight percent, or, in some cases, from 10 to 30 weight percent, wherein the weight percent is based on the total weight of the coating composition.

As discussed above, in certain embodiments, the coating compositions of the present invention comprise a hydrocarbon compound. Suitable hydrocarbon compounds may be in liquid and/or solid form. Typically, hydrocarbon compounds have a variety of different softening points. As used herein, the term "softening point" and like terms refer to the temperature at which viscous flow of a material that does not have a definite melting point changes to plastic flow. In certain embodiments, hydrocarbon compounds having different softening points may be blended together and used in the coating compositions of the present invention. In certain embodiments, the hydrocarbon compounds useful in the present invention include hydrocarbon resins having softening points of from 50° C. to 140° C., such as from 100° C. to 130° C.

Suitable hydrocarbon compounds useful in the present invention include, but are not limited to, courmarone-indene resins; terpene resins; ketone resins; petroleum resins, for example, aliphatic hydrocarbon resins having six or fewer carbon atoms, such as five aliphatic carbon atoms, including those produced from acyclic aliphatic monomers, for example, cis-1,3 pentadiene, trans-1,3 pentadiene, 2-methyl-2-butene, cyclopentadienes, and vinyltoluene copolymers; and alkylated aromatic hydrocarbon resins having from eight to ten carbon atoms, including those produced from C-8, C-9, and C-10 monomers, for example, styrene, vinyl toluene, indene, methyl indene, and α-methyl styrene. In other embodiments, suitable C-9 resins include petroleum aromatic hydrocarbon resins having softening points from 100° C. to 135° C. Suitable hydrocarbon compounds are commercially available, including those sold under the product name SB-1000, SB-1100, SB-140ES, available from Sunbelt Chemical, Inc., Dallas, Tex.; those sold under the product name Resinall, including Resinall 711, Resinall 717, Resinall 771, and Resinall 769 available from Resinall, Stanford, Conn.; as well as those sold under the product name Nevchem, including Nevchem 110, Nevchem 120, and Nevchem 130, available from Neville Chemical, Pittsburgh, Pa.

As indicated above, in certain embodiments, a combination of hydrocarbon compounds may be useful in the coating compositions of the present invention.

In certain embodiments, the hydrocarbon compound may be present in the coating compositions of the present invention from 1 to 50 weight percent, such as 3 to 30 weight percent, or, in some cases, 5 to 20 weight percent, wherein the weight percent is based on the total weight of the coating composition.

The hydrocarbon compound provides improved package stability in a one-component system. It is surprising that the hydrocarbon compounds of the present invention provide improved resistance to hot water immersion of a coating film deposited from the coating compositions of the present invention, for example, wherein the water is at a temperature of at least 180° F. (82.2° C.), while also improving dry times, corrosion resistance, adhesion, and improved package stability in a high solids, one-component, storage stable coating composition of the present invention.

As previously indicated, in certain embodiments, the coating compositions of the present invention comprise an alkoxy-functional and/or silanol-functional silicone. In other words, the coating compositions of the present invention comprise an alkoxy-functional silicone, a silanol-functional silicone, or a combination thereof. As used herein, the term "alkoxy-functional and/or silanol-functional silicone" refers to silicones comprising alkoxy functional groups, —OR, and/or hydroxy functional groups, —OH, wherein R is an alkyl group or an aryl group. As used herein, the term "silicone" refers to polysiloxane polymers, which are based on a structure comprising alternate silicon and oxygen atoms. In certain embodiments, the alkoxy-functional and/or silanol-functional silicone comprise a compound represented by the general formula:

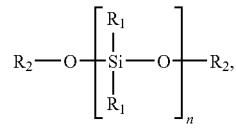

wherein each $R_1$ is independently selected from the group consisting of a hydroxy group, an alkyl group having up to six carbon atoms, an aryl group having up to six carbon atoms, and an alkoxy group having up to six carbon atoms; each $R_2$ is independently selected from the group consisting of hydrogen, an alkyl group having up to six carbon atoms, and an aryl group having up to six carbon atoms. In certain embodiments, $R_1$ and $R_2$ comprise groups having less than six carbon atoms to facilitate rapid hydrolysis, which reaction is driven by the volatility of the alcohol analog product of the hydrolysis. In certain embodiments, "n" is selected so that the foregoing silicone has a weight average molecular weight in the range of from 400 to 10,000, such as from 400 to 2,000.

In certain embodiments, alkoxy-functional silicones useful in the coating compositions of the present invention have an alkoxy content from 5 to 40 percent by weight, such as 10 to 30 percent by weight, wherein percent by weight is based on the total weight of the alkoxy-functional silicone.

Alkoxy-functional and/or silanol-functional silicones which are suitable for use in the present invention are commercially available and include, for example, (a) methoxy-functional silicones, such as DC-3074 and DC-3037 commercially available from Dow Corning; and GE SR191, IC-232, SY-550, and SY-231 commercially available from Wacker Silicones located in Adrian, Mich.; KR-410N available from Shin Etsu; and (b) silanol-functional silicones, such as Dow Corning's DC-840, Z6018, Q1-2530 and 6-2230.

In certain embodiments, a combination of alkoxy-functional and/or silanol-functional silicones may be used in the coating compositions of the present invention.

In certain embodiments, the alkoxy-functional and/or silanol-functional silicone is present in the coating compositions of the present invention in an amount ranging from 0.1 to 35 percent by weight, such as 0.5 to 20 percent by weight, or, in some cases, 0.5 to 15 percent by weight, with the weight percents being based on the total weight of the coating composition.

It is surprising that the alkoxy-functional and/or silanol-functional silicones of the present invention provide improved hardness and mar resistance to the coating film, as well as improved adhesion and corrosion resistance to the particular substrate to which the film is applied, while maintaining acceptable package stability in a high solids, one-component, storage stable coating composition of the present invention.

In addition to the previously described components, the coating compositions of the present invention also comprise a ketimine curing agent. Typically, a ketimine curing agent may be obtained by a condensation reaction between a compound having a primary amino group in the molecule and a compound having a ketone group in the molecule. When exposed to moisture, a ketimine curing agent produces a primary amine to function as a curing agent in an epoxy resin composition. A ketimine curing agent remains stable in a system containing an epoxy-functional compound until the ketimine curing agent is brought into contact with moisture supplied from outside the system.

In certain embodiments, the ketimine curing agent comprises the reaction product of reactants comprising a polyalkyldiamine component and a ketone component.

In certain embodiments, the ketimine curing agent comprises the reaction product of reactants comprising a polyoxyalkyldiamine component and a ketone component.

In certain embodiments, the ketimine curing agent comprises the reaction product of reactants comprising a polyoxypropylenediamine component and a ketone component.

In certain embodiments, the polyoxypropylenediamine component is a compound represented by the general formula: $H_2N-C_3H_6(-O-C_3H_6-)_nNH_2$, wherein "n" represents a positive number. In other embodiments, the polyoxypropylenediamine component comprises a combination of more than one polyoxypropylenediamine compound having different molecular weights, such as, a polyoxypropylenediamine compound having a molecular weight of 200 to 500 (n≈2 to 8), such as 200 to 400 (n≈2 to 6), and a polyoxypropylenediamine compound having a molecular weight of 1,000 to 3,000 (n≈15 to 50), such as 1,200 to 2,500 (n≈20 to 40). In certain embodiments, the weight ratio of the former to the latter is from 9:1 to 6:4, such as from 8.5:1.5 to 5.5:4.5.

As previously mentioned, the ketimine curing agent comprises the reaction product of reactants comprising a polyalkyldiamine component (such as a polyoxyalkyldiamine component or polyoxypropylenediamine component) and a ketone component. Suitable ketone components include, but are not limited to, acetone, methyl ethyl ketone, diethyl ketone, methyl propyl ketone, methyl isopropyl ketone, methyl isobutyl ketone, diisopropyl ketone, phenyl methyl ketone, methylhexanone, methylcyclohexanone, cyclopentanone, cycloheptanone, acetophenone, ketone resins, and combinations thereof. In certain embodiments, a combination of ketone components, including any of those aforementioned, may be used to prepare the ketimine curing agent of the present invention. In certain embodiments, the ketone component includes dialkyl ketones, for example, methyl isobutyl ketone.

In certain embodiments, the ketimine curing agent for use in the coating compositions of the present invention has a degree of ketimination of 90% or higher, such as 95% or higher.

In other embodiments, the amount of the ketone component to the amount of the polyalkyldiamine component (such as a polyoxyalkyldiamine component or polyoxypropylenediamine component) in the ketimine curing agent ranges from 2 moles or greater of the ketone component per mole of the polyoxypropylenediamine component.

The process for preparing the ketimine curing agent from the polyalkyldiamine component (such as a polyoxyalkyldiamine component or polyoxypropylenediamine component) and the ketone component is not restricted. For example, in certain embodiments, the ketimine curing agent can be obtained by allowing the polyalkyldiamine component (such as a polyoxyalkyldiamine component or polyoxypropylenediamine component) and the ketone component to react in the presence of a catalyst. In other embodiments, the ketimine curing agent can be obtained by allowing the polyalkyldiamine component (such as a polyoxyalkyldiamine component or polyoxypropylenediamine component) and the ketone component to react with or without a solvent.

In certain embodiments, the catalyst which can be used in the preparation of the ketimine curing agents of the present invention includes tertiary amines, such as trimethylamine, ethyldimethylamine, triethylamine, propyldimethylamine, tributylamine, triethylenediamine, N,N'-dimethylpiperazine, pyridine, picoline, 1,8-diazabicyclo(5.4.0)undecene-7, benzyldimethylamine, 2-(dimethylaminomethyl)phenol, and 2,4,6-tris(dimethylaminomethyl)phenol; and sulfonic acids, such as methanesulfonic acid, benzenesulfonic acid, m-xylenesulfonic acid, p-toluenesulfonic acid, hydroxymethylsulfonic acid, 2-hydroxyethylsulfonic acid, hydroxypropylsulfonic acid, trifluoromethanesulfonic acid, sulfosalicylic acid, and sulfophthalic acid.

In certain embodiments, a combination of a tertiary amine and sulfonic acid or a salt formed therefrom, such as a triethylamine salt of p-toluenesulfonic acid, may be used as a catalyst to prepare the ketimine curing agents of the present invention.

In other embodiments, the catalyst may be present in an amount of 0.001 to 5 percent by weight, such as 0.01 to 1 percent by weight, based on the total weight of the polyalkyldiamine component (such as a polyoxyalkyldiamine component or polyoxypropylenediamine component).

As indicated above, in certain embodiments, the reaction to prepare the ketimine curing agent may include a solvent. Suitable solvents include, but are not limited to, acetone and methyl ethyl ketone, which can be used in excess to serve as a solvent when either is present as a ketone component. Other solvents that can be used for the reaction include aromatic hydrocarbons, such as benzene, toluene, xylene, dioxane, tetrahydrofuran, and N-methyl-2-pyrrolidone. The amount of solvent may vary, although, in certain embodiments, it may range from 10 to 100 percent by weight based on the total weight of the polyalkyldiamine component (such as a polyoxyalkyldiamine component or polyoxypropylenediamine component) and the ketone component.

Ketimine curing agents which are suitable for use in the present invention are commercially available, and include those sold by Asahi Denka under the product name EH-235RS-A.

In certain embodiments, the amount of ketimine curing agent present in the coating compositions of the present invention ranges from 1 to 30 percent by weight, such as from 2 to 15 percent by weight, wherein the percent by weight is based on the total weight of the coating composition.

Further details of the ketimine curing agents suitable for use in the coating compositions of the present invention are disclosed in U.S. Pat. No. 7,226,981, the contents of which are incorporated herein by reference.

As will be appreciated, the type of curing agent(s) selected for inclusion in the coating compositions of the present invention will often depend on the particular type of application and type of other ingredients being used. As will also be appreciated, the coating compositions of the present invention can be formed using a combination of more than one type of curing agent.

In certain embodiments, in addition to the ketimine curing agent comprising a reaction product of reactants comprising a polyalkyldiamine component (such as a polyoxyalkyldiamine component or polyoxypropylenediamine component) and a ketone component, the coating composition of the present invention may also include a ketimine curing agent other than the above-mentioned ketimine curing agent comprising the reaction product of reactants comprising a polyalkyldiamine component (such as a polyoxyalkyldiamine component or polyoxypropylenediamine component) and a ketone component. By contrast, in other embodiments, the coating compositions of the present invention are substantially free, or, in some cases, completely free, of such other ketimine curing agents. As used herein, when it is stated that a coating composition of the present invention is "substantially free" of a particular material, it means that the material being discussed is present in the composition, if at all, as an incidental impurity. In other words, the material does not affect the properties of the composition. Moreover, when it is stated that a coating composition of the present invention is "completely free" of a particular material it means that the material being discussed is not present in the composition at all.

Suitable examples of other ketimine curing agents include those comprising the reaction product of reactants comprising a ketone component, including any of those aforementioned ketone components, and a polyalkylpolyamine component. Suitable polyalkylpolyamine components include, but are not limited to, diethylenetriamine, triethylenetriamine, and tetraethylenepentamine; alicyclic polyamines, including, for example, 1,2-diaminocyclohexane, 1,4-diamino-3,6-diethylcyclohexane, and isophoronediamine; aromatic polyamines, including, for example, m-xylylenediamine, diaminodiphenylmethane, and diaminodiphenylsulfone; and polyoxyalkylene-polyamines, including, for example, polyoxyethylene-polyamine, polyoxy-tetramethylene-polyamine, and polyoxyethylene-polyoxypropylene-polyamine. Combinations of any of the aforementioned polyalkylpolyamine components may also be suitable.

Ketimine curing agents other than the above-mentioned ketimine curing agent comprising the reaction product of reactants comprising a polyalkyldiamine component (such as a polyoxyalkyldiamine component or polyoxypropylenediamine component) and a ketone component which are suitable for use in the present invention are commercially available and include, but are not limited to, those available from Air Products under the product name 2457 (dimethylisobutyl ketone ketimine of diethylenetriamine); and from Bayer Corp. under the product name LS 2965 (dimethylisobutyl ketone ketimine of isophorone diamine).

The amount of other ketimine curing agents may vary. In certain embodiments, the amount of other ketimine curing agents is 50 percent by weight or less, such as 30 percent by weight or less, and, in other cases, such as 10 percent by weight or less, based on the total weight of the ketimine curing agents present in the coating compositions of the present invention.

In addition to the previously described ketimine curing agents, the coating compositions of the present invention may also comprise an aldimine curing agent. In contrast, in other embodiments, the coating compositions of the present invention are substantially free, or, in some cases, completely free, of such aldimine curing agents.

Suitable aldimine curing agents useful in the coating compositions of the present invention include those obtained by the reaction of an amine with an aldehyde, respectively, and include dialdimines such as those described in U.S. Pat. No. 3,668,183. In other embodiments, suitable aldimines may include a dialdimine of isophorone diamine, one that is available, for example, from Huls of Germany under the product name A139.

The amount of aldimine curing agents may vary. In certain embodiments, the amount of aldimine curing agents is 50 percent by weight or less, such as 30 percent by weight or less, and, in other cases, such as 10 percent by weight or less, based on the total weight of the ketimine curing agents present in the coating compositions of the present invention.

In certain embodiments, the amount of ketimine curing agent comprising the reaction product of reactants comprising a polyalkyldiamine component (such as a polyoxyalkyldiamine component or polyoxypropylenediamine component) and a ketone component is 90 percent by weight or more and the amount of other curing agents is 10 percent by weight or less, wherein percent by weight is based on the total weight of the curing agents present in the coating compositions of the present invention.

In certain embodiments, the weight ratio of amine hydrogen equivalents of the ketimine curing agent to epoxy equivalents of the epoxy resin ranges from 0.75:1 to 1.25:1.

It is surprising that the ingredients in the coating compositions of the present invention may be combined to provide a one-component, storage stable composition at high solids having excellent package storage stability, enabling the coating compositions to be applied to a particular substrate via conventional techniques, while also producing high hardness of a coating film; good hot water immersion properties; good adhesion to a variety of substrates; and good corrosion resistance over metal substrates.

In certain embodiments, the coating compositions of the present invention may comprise any of a variety of additional optional components. In other embodiments, however, the coating compositions of the present invention are substantially free, or, in some cases, completely free, of such a component.

In certain embodiments, the coating compositions of the present invention may further comprise a solvent. In certain embodiments, the solvent may be used to dissolve a solid epoxy and/or hydrocarbon resin, if a solid form is present. Suitable solvents may also include those solvents having a low moisture content. By contrast, in other embodiments, the coating compositions of the present invention are substantially free, or, in some cases, completely free, of such a solvent.

Suitable solvents include, but are not limited to, aromatic hydrocarbons, esters, ketones, alcohols, glycols, glycol ethers, and chlorinated solvents. Suitable ketones include methyl ethyl ketone, methyl amyl ketone, diethyl ketone, acetone, methyl isopropyl ketone, propylene glycol monomethyl ether acetate, and cyclohexanone; suitable ethers include tetrahydrofuran, 1,2-dimethoxyethane, and 1,2-diethoxyethane; suitable esters include ethyl acetate and n-butyl acetate; suitable alcohols include isobutanol, n-butanol, 2-propanol, n-propanol, and amyl alcohol; suitable aromatic hydrocarbons include benzene, toluene, and xylene; suitable terpene hydrocarbon oils include turpentine oil, D-limonene, and pinene; suitable paraffinic solvents include mineral spirit, Swasol 310 (from Cosmo Matsuyama Oil Co., Ltd.), and Solvesso 100 (from Exxon Chemical Company); suitable halogenated aliphatic hydrocarbons include carbon tetrachloride, chloroform, trichloroethylene, and methylene chloride; suitable halogenated aromatic hydrocarbons include chlorobenzene; aniline, triethylamine, pyridine, dioxane, acetic acid, acetonitrile, and carbon disulfide.

Combinations of one or more solvents, including any of those mentioned above, may also be useful. In certain embodiments, the solvent comprises aromatic hydrocarbons, ketones, and combinations thereof. In other embodiments, the solvent comprises a blend of aromatic hydrocarbon and methyl amyl ketone at a weight ratio of 1:1.

The solvent, if present, may be used at any suitable amount. In certain embodiments, the solvent is present in the coating compositions of the present invention up to 50 percent by weight, such as 15 to 30 percent by weight, wherein the percent by weight is based on the total weight of the coating composition.

In certain embodiments, the coating compositions of the present invention comprise a moisture scavenger for the purpose of, for example, reducing the presence of excess water during, for example, stages of forming the coating composition where excess water is not desired. Suitable moisture scavenging ingredients include those such as molecular sieves, such as under the product name Zeolite; calcium compounds, such as $CaSO_4 \cdot \frac{1}{2}H_2O$; titanates; calcium-metal alkoxides; tetraisopropyltitanate; tetra n-butyl titanate-silane, QP-5314, vinylsilane (A171); ρ-toluenesulfonyl isocyanate, such as the material sold under the trade name PTSI, commercially available from Vandemark, Inc.; organic alkoxy compounds, such as triethylorthoformate (including, for example, Additive OF made by Bayer Corp. of Pittsburgh, Pa.), methylorthoformate, dimethoxypropane; and organooxysilanes, such as vinyltrimethoxysilane and methyltrimethoxysilane.

Combinations of one or more moisture scavengers, including any of those mentioned above, may also be useful. In certain embodiments, the moisture scavenger is vinyltrimethoxysilane. In certain other embodiments, the moisture scavenger is a combination of PTSI, Additive OF, and methyltrimethoxysilane.

In certain embodiments, the moisture scavenger is present in the coating composition of the present invention in an amount of up to 10 weight percent, such as 0.5 to 5 weight percent, with the weight percents being based on the total weight of the coating composition. By contrast, in other embodiments, the coating compositions of the present invention are substantially free, or, in some cases, completely free, of such a moisture scavenger.

In certain embodiments, the coating compositions of the present invention comprise an epoxy-functional compound different from the previously described epoxy resins. In certain embodiments, the epoxy-functional compound, different from the previously described epoxy resins, include epoxy-functional acrylic resins, epoxy-functional silane resins, epoxy-functional silicones, and combinations thereof. The epoxy-functional compound different from the previously described epoxy resins is an optional ingredient in the coating compositions of the present invention and, therefore, in certain embodiments, the coating compositions of the present invention are substantially free, or, in some cases, completely free, of such an ingredient.

Suitable epoxy-functional acrylic resins include glycidyl ether functional polymers, glycidyl methacrylate (GMA) functional resins, and any epoxy-functional materials, e.g., epoxidized Soya bean oil or the like. Suitable epoxy-functional acrylic resin are commercially available from Akzo Nobel Resins, for example, under the product name Setalux, including, Setalux 8503 SS60 (epoxide equivalent weight of approximately 569); and from Nuplex under the product name ACR, such as ACR531XD.

Suitable epoxy-functional silane resins are commercially available from OSi Specialties, Inc., of Danbury, Conn., for example, under the product name Silquest A-187 (a γ-glycidoxypropyltrimethoxysilane).

Suitable epoxy-functional silicones are set forth in U.S. Patent Publication No. 2007/0213492 at [0019] to [0021], the cited portion of which being incorporated herein by reference.

In certain embodiments, the coating compositions of the present invention may comprise a reactive or non-reactive diluent. The reactive or non-reactive diluent is an optional ingredient in the coating compositions of the present invention and, therefore, in certain embodiments, the coating compositions of the present invention are substantially free, or, in some cases, completely free, of such an ingredient. Suitable reactive diluents include, but are not limited to, monoglycidyl ether compounds, such as monoglycidyl ether of phenol, cresol, ethylphenol, propylphenol, p-tert-butylphenol, p-tert-amylphenol, hexylphenol, octylphenol, nonylphenol, dodecylphenol, octadecylphenol or terpenephenol. Suitable non-reactive diluents include dioctyl phthalate, dibutyl phthalate, and benzyl alcohol.

Combinations of one or more reactive and/or non-reactive diluents, including any of those mentioned above, may also be useful. If present, the reactive and/or non-reactive diluent may be present at any suitable amount, such as 15 weight percent or less, based on the total weight of the coating composition.

In certain embodiments, the coating compositions of the present invention comprise a catalyst. The catalyst is an optional ingredient in the coating compositions of the present invention and, therefore, in certain embodiments, the coating compositions of the present invention are substantially free, or, in some cases, completely free, of such an ingredient.

Examples of suitable catalysts include, but are not limited to, tertiary amines, such as trimethylamine, ethyldimethylamine, propyldimethylamine, N,N'-dimethylpiperazine, pyridine, picoline, 1,8-diazabicyclo(5.4.0)undecene-1 (DBU), benzyldimethylamine, 2-(dimethylaminomethyl) phenol (DMP-10), and 2,4,6-tris(dimethylaminomethyl)phenol (DMP-30); phenols, such as phenol novolac, o-cresol novolac, p-cresol novolac, t-butylphenol novolac, and dicyclopendadiene cresol; p-toluenesulfonic acid, and a 1-aminopyrrolidine salt of thiocyanic acid.

In certain embodiments, the coating compositions of the present invention comprise a catalyst, such as an organometallic catalyst. Suitable organometallic catalysts can be useful for the purpose of accelerating the curing rate of the composition into a protective film coating over a broad temperature range. In certain use applications calling for ambient temperature cure of the composition, the organometallic catalyst may also be useful for providing accelerated cure rates at such ambient temperature cure conditions. Suitable catalysts include tin catalysts comprising a compound having the general formula:

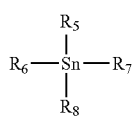

where $R_5$ and $R_6$ are each independently selected from an alkyl group, an aryl group, and an alkoxy group, each group having up to eleven carbon atoms, and where $R_7$ and $R_8$ are each independently selected from the same groups as $R_5$ and $R_6$, or from groups consisting of inorganic atoms, such as halogens, sulfur, or oxygen. Example catalysts include organotin materials such as dibutyltin dilaurate, dibutyltin diacetate, dibutyltin diacetyldiacetonate, and organotitanates.

Other useful organometallic catalysts include lead octoate, lead neodecanoate, bismuth nitrate, bismuth octoate, bismuth neodecanoate, bismuth napthenate, bismuth versalate, manganese napthenate/pentanedione, manganese octoate, vanadium acetylacetonate, zinc acetylacetonate, tin neodecanoate, stannous 2-ethyl hexanoate, lithium neodecanoate, stannic chloride, stannous octoate, zinc napthenate, zinc octoate, ferric acetylacetonate, zinc acetylacetonate, cobalt octoate, zirconium acetylacetonate, zirconium octoate, zirconium versalate, aluminum acetylacetonate, mercuric acetate, phenylmercuric acetate, phenylmercuric propionate, organopolymercury compounds, and crown ether complexes of Lanthanide metals. Many of these catalysts are commercially available. Commercial mixtures of catalysts useful in the invention include Cocure, Cotin, and Coscat catalysts, (Caschem, Inc.); Niax catalysts (Union Carbide); Polycat catalysts (Abbott Laboratories); Dabco catalysts (Air Products and Chemicals Inc.); Thancat catalysts (Texaco Chemical Co.); Stanclere TL (AKZO Chemicals Inc.); K-Kat Catalysts (King Industries), Curene catalysts (Anderson Development Co.); Bulab 600 catalysts (Buckman Laboratories, Inc.); Optic Part 14× (PolyTech Development Corp.); Metasol catalysts (Calgon Corporation); CC-1 and CC-3 catalysts (Cardinal Carolina Corp.); Conacure catalysts (Conap, Inc.); Cata-check catalysts (Ferro Corp.); KR catalysts (Kenrich Petrochemicals, Inc.); BiCAT catalysts (Shepherd Chemical Co.); Texacat, ZR, ZF, DD, DMDEE catalysts (Texaco Chemical Co.); Thor 535 catalysts (Thor Chemicals, Inc.); Toyocat catalysts (Tosoh USA, Inc.). Combinations of any of the aforementioned catalysts may also be useful.

In certain embodiments, the catalyst is present in the coating composition in an amount of up to 10 percent by weight, such as 0.02 to 5 percent by weight, or, in some cases, 0.08 to 2 percent by weight, with the weight percents being based on the total weight of the coating composition. By contrast, in other embodiments, the coating compositions of the present invention are substantially free, or, in some cases, completely free, of such a catalyst.

In addition, certain embodiments of the coating compositions of the present invention comprise a silane comprising a compound represented by the general formula:

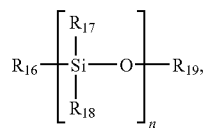

wherein each $R_{16}$, $R_{17}$ and $R_{18}$ is independently selected from the group consisting of a hydrogen, an alkyl group, an aryl group, a cycloalkyl group, an alkoxy group, an aryloxy group, a hydroxyalkyl group, an alkoxyalkyl group, and a hydroxyalkoxyalkyl group, wherein each of the aforementioned groups may contain up to six carbon atoms; $R_{19}$ is independently selected from the group consisting of a hydrogen, an aryl group having up to six carbon atoms, and an alkyl group having up to six carbon atoms; and n is selected so that the silane has a weight average molecular weight ranging from 150 to 600.

In certain embodiments, "n" is in the range of from 1 to 5. In other embodiments, at least one of the groups $R_{16}$, $R_{17}$, $R_{18}$, and $R_{19}$ includes an oxy constituent for polymerization. In still other embodiments, the silane comprises an alkoxyfunctional silane. The silane is an optional ingredient in the coating compositions of the present invention and, therefore, in certain embodiments, the coating compositions of the present invention are substantially free, or, in some cases, completely free, of such an ingredient.

Suitable silanes are commercially available and include organooxysilanes, including a phenyl/methyl methoxysilane that is available from Dow Corning under the product name QP8-5314; dimethyldimethoxysilane that is available from Dow Corning under the product name DC-6194; octyltriethoxysilane that is available from Dow Corning under the product name DC-6341; and glycidoxypropyltrimethoxysilane that is available from Momentive Performance Materials under the product name Z-6040. Combinations of silanes, including any of the aforementioned, may also be useful in the coating compositions of the present invention.

In certain embodiments, if present, the silane is present in the coating compositions of the present invention in an amount of up to 10 percent by weight, such as 0.5 to 5 percent by weight, or, in some cases 0.85 to 2 percent by weight, with the weight percents being based on the total weight of the coating composition.

In addition, other ingredients useful in forming the coating compositions of this invention include plasticizers, extenders, fillers, corrosion inhibitors, and various types of additives such as UV stabilizers, pigment wetting agents, flow and leveling additives, thixatropes, defoamers and the like.

In certain embodiments, the coating compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes, and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coating compositions by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP- PBO red"), titanium dioxide, iron oxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum, and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nanometers, such as less than 70 nanometers, or less than 30 nanometers. Nanoparticles can be produced by milling stock organic or inorganic pigments with grinding media having a particle size of less than 0.5 millimeters. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Publication No. 2005/0287348 A1, filed Jun. 24, 2004; U.S. Provisional Application No. 60/482,167 filed Jun. 24, 2003; and U.S. Patent Publication No. 2006/0251896 A1, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from, for example, 1 to 65 weight percent of the present compositions, such as from 3 to 40 weight percent or 5 to 35 weight percent, with weight percent based on the total weight of the compositions.

In certain embodiments, the compositions of the present invention comprise a finely divided particulate filler. Examples of fillers include, but are not limited to, barytes (barium sulfate), talc, mica, micaceous iron oxide, aluminum flake, glass flake, and stainless steel flake. In those embodiments where a filler is present, the filler may be present at any suitable amount, for example, up to 20 percent by weight based on the total weight of the composition.

In other embodiments, the compositions may include corrosion inhibitors, including but not limited to, zinc phosphate, zinc aluminum phosphate hydrate, such as Heucophos ZPA; zinc molybdenum phosphate, such as Heuco ZMP; organic/inorganic modified basic zinc phosphate hydrate, such as Hueco-ZPZ; zinc aluminum polyphosphate hydrate, such as Heuco ZAPP; and calcium aluminum polyphosphate silicate hydrate, such as Heuco CAPP, all commercially available from Heuback. Other suitable corrosion inhibitors include, but are not limited to, strontium zinc phosphosilicate, calcium borosilicate, organically modified mineral pigments, for example those commercially available from Halox Products under the product name Halox 410 and Halox 430; and organic corrosion inhibitors, such as alkylammonium salt solutions, commercially available as Halox 630; modified barium metaborates, for example, Busan 11M1 from Buckman Labs; and calcium ion exchanged amorphous silica gel, commercially available under the product name Shieldex, available from W R Grace. Certain embodiments of the coating compositions of the present invention include up to 10 percent by weight filler based on the total weight of the composition. In those embodiments where a corrosion inhibitor is present, the corrosion inhibitor may be present at any suitable amount, for example, up to 20 percent by weight based on the total weight of the composition.

The sources of water in the coating compositions of the present invention can be, for example, from a reaction between ingredients, atmospheric humidity, and water present in one or more of the ingredients. Water may be added during the formation of the composition to accelerate cure depending on the particular cure conditions, e.g., such as the use of the composition in arid environments where cure takes place at ambient temperature conditions.

In certain embodiments, the coating compositions of the present invention comprise a sufficient amount of water to facilitate unblocking of any curing agent present in the form of a ketimine for subsequent crosslinking, and/or to hydrolyze any alkoxy functionality in any alkoxy-functional silicone, and/or any silane ingredient.

In certain embodiments, when the one component coating composition is exposed to water, any curing agent provided in the form of a ketimine is unblocked to expose amine functionality. The alkoxy-functional and/or silanol-functional silicone, or any silane comprising alkoxy groups undergo hydrolysis in the presence of water, and polycondensation with themselves and with one another.

The combined ingredients used for forming the one-component coating compositions of this invention are often provided in a moisture-proof container to control or prevent unwanted evaporation and/or hydrolysis and condensation of the constituent chemical ingredients, thus increasing the shelf life of the mixture. Sealed metal cans are suitable. In certain embodiments, the ingredients are packaged under nitrogen.

In certain embodiments, the present invention is directed to a substrate at least partially coated with a coating deposited from any of the foregoing coating compositions. In certain embodiments, the coating compositions of the present invention may be applied directly to at least a portion of the substrate. In other embodiments, the coating compositions may be applied to any coating material and/or treatment which was previously applied to at least a portion of the substrate. Compositions of this invention can be applied to a desired substrate surface to protect it from weathering, impact, and exposure to corrosion and/or chemicals.

The coating compositions of the present invention are suitable for application to any of a variety of substrates, including cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or work pieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof. In certain embodiments, the metallic substrate may be blasted with sand and/or metal shot to provide a profile to the substrate.

Examples of suitable silicatic substrates include glass, porcelain, ceramics, and the like.

Examples of suitable cementitious materials include cement, aggregate, granite, and the like.

Examples of suitable polymeric substrates include polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates include fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates include grain leather (e.g., nappa from sheep, goat, or cow and box-leather from calf or cow), suede leather (e.g., velours from sheep, goat, or calf and hunting leather), split velours (e.g., from cow or calf skin), buckskin and nubuk leather; further also woolen skins and furs (e.g., fur-bearing suede leather). The leather may have been tanned by any conventional tanning method, in particular vegetable, mineral, synthetic, or combined tanned (e.g., chrome tanned, zirconyl tanned, aluminium tanned, or semi-chrome tanned). If desired, the leather may also be re-tanned; for re-tanning there may be used any tanning agent conventionally employed for re-tanning, e.g., mineral, vegetable, or synthetic tanning agents, e.g., chromium, zirconyl or aluminum derivatives, quebracho, chestnut or mimosa extracts, aromatic syntans, polyurethanes, (co)polymers of (meth)acrylic acid compounds or melamine, dicyanodiamide, and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams, and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

Compositions of the present invention may be useful as a single coating, for example, as a clearcoat and/or a topcoat; as a basecoat in a two-coat composition; or as a layer of a multi-component coating, for example, as a primer layer, basecoat and/or topcoat layer, and/or as a clearcoat layer. Compositions of this invention are useful, for example, as a primer, a basecoat, a topcoat, and/or a clearcoat disposed either directly onto the substrate surface itself or disposed onto prior underlying coating(s) and/or treatment(s), e.g., an inorganic or organic treatment, a primer, and/or basecoat material, disposed on the substrate surface to achieve a desired purpose. In certain embodiments, the coating compositions of the present invention may be useful as a primer disposed directly onto the substrate surface itself. In other embodiments, the coating compositions of the present invention may be applied to a substrate surface that has been cleaned and/or treated with a substance, for example, a degreaser.

Compositions of this invention can be applied to a substrate to be treated by conventional coating techniques such as, for example, dip coating, direct roll coating, reverse roll coating, curtain coating, spray coating, brush coating, and combinations thereof, among other methods. After application of the coating composition to the substrate, the composition is allowed to coalesce to form a substantially continuous film on the substrate. Typically, the film thicknesses will be 0.01 to 20 mils (about 0.25 to 508 microns), such as 0.01 to 5 mils (about 0.25 to 127 microns), or, in some cases 0.1 to 3 mils (2.54 to 76.2 microns) in thickness. If necessary, multiple layers can be applied to the substrate to be protected.

Certain embodiments of the present invention relate to methods of applying a multi-layer coating to a substrate comprising: applying a first coating layer over a least a portion of a substrate, wherein the first coating layer is deposited from a coating composition of the present invention; and applying a second coating layer over at least a portion of the first coating layer. In certain embodiments, the second coating layer is deposited from a basecoat and/or topcoat coating composition.

In still other embodiments, the methods of the present invention further comprise applying a third coating layer over at least a portion of the second coating layer, wherein the third coating layer is deposited from a substantially clear coating composition. As used herein, the term "substantially clear coating" and like terms refer to a coating that imparts little or no color to an underlying substrate or coating.

In yet other embodiments, a coating layer deposited from a coating composition of the present invention may be applied over top at least a portion of a corrosion resistant layer that has already been applied to a substrate, for example, such as a zinc rich primer coating layer, an electrodepositable coating layer, and the like. Subsequent coating layer(s) may be applied over the layer deposited from a coating composition of the present invention, for example, a basecoat/clearcoat and/or topcoat coating composition.

As indicated above, in certain embodiments, the coating compositions of the present invention are curable at low temperatures. Although the coating compositions of the present invention are curable at low temperatures, such as at ambient temperatures, the coating compositions may also be cured over a broad range of temperature conditions, e.g., under conditions of elevated temperatures such as when the applied composition is subjected to a bake condition that can and will vary depending on the temperature of the surrounding environment, for example, temperatures that can vary from 5° C. to 60° C.

Illustrating the invention are the following examples that are not to be considered as limiting the invention to their details. All parts and percentages in the examples, as well as throughout the specification, are by weight unless otherwise indicated.

EXAMPLES

Preparation of Coating Compositions

Coating Compositions (Examples 1 through 5) were prepared using the components and amounts identified in Table 1.

TABLE 1

| Description | Example 1 | Example 2 | Example 3 | Example 4 | Example 5 |
|---|---|---|---|---|---|
| Part A | | | | | |
| Epon 1001-O-75[1] | 290.3 | 290.3 | 290.3 | 290.3 | 290.3 |
| Anti-Terra U[2] | 9.0 | 9.0 | 9.0 | 9.0 | 9.0 |
| Suspeno 201-NBA[3] | 8.7 | 8.7 | 8.7 | 8.7 | 8.7 |
| KROMA RO-5097[4] | 59.0 | 59.0 | 59.0 | 59.0 | 59.0 |
| Nytal 3300[5] | 240.9 | 225.0 | 225.0 | 225.0 | 225.0 |
| Bartex 65[6] | 211.1 | 200.0 | 200.0 | 200.0 | 200.0 |
| Bentone SD-2[7] | 2.0 | 2.0 | 2.0 | 2.0 | 2.0 |
| A171[8] | 10.3 | 9.1 | 9.1 | 9.1 | 9.1 |
| Part B | | | | | |
| Aromatic 150[9] | 111.1 | — | — | — | — |
| Xylene | — | 110.0 | 110.0 | 110.0 | 110.0 |
| SB-1100[10] | 69.4 | 69.4 | 69.4 | 69.4 | 69.4 |
| Part C | | | | | |
| Methyl Amyl Ketone | 67.3 | 70.0 | 70.0 | 70.0 | 70.0 |
| A171[8] | 33.8 | 30.0 | 30.0 | 30.0 | 30.0 |
| KR-401N[11] | 23.8 | — | — | — | — |
| EH-235RS[12] | 58.6 | — | — | — | — |
| Ancamine 2457[13] | — | 16.9 | — | — | — |
| Vestamin A139[14] | — | — | 45.6 | — | — |
| Ancamine 2458[15] | — | — | — | 17.1 | — |
| Ancamine 2459[16] | — | — | — | — | 32.9 |

[1] Epoxy resin at 75% weight solids in methyl n-amyl ketone commercially available from Hexion Specialty Chemicals.
[2] 50% solids solution of a salt of unsaturated polyamine amides and low molecular weight acidic polyesters commercially available from Byk Chemie GmbH.
[3] Antisettling agent commercially available from Poly-Resyn, Inc.
[4] Red Iron Oxide pigment commercially available under the product name KROMA from GMZ Inc.
[5] Talc commercially available from R. T. Vanderbilt.
[6] Barium sulfate commercially available from TOR Minerals International.
[7] Rheological additive commercially available from Elementis Specialties Inc.
[8] Vinyl trimethoxysilane moisture scavenger commercially available from Momentive.
[9] Solvent (hydrocarbon fluid) commercially available from Exxon Mobile Chemical.
[10] Hydrocarbon resin commercially available from Sunbelt Chemicals, Inc.
[11] Alkoxy-functional silicone commercially available from Shin-Etsu Silicones.
[12] Ketimine curing agent commercially available from Asahi Denka.
[13] Ketimine curing agent commercially available from Air Products and Chemicals, Inc.
[14] Aldimine curing agent commercially available from Degussa-Huls AG.
[15] Ketimine curing agent commercially available from Air Products and Chemicals, Inc.
[16] Ketimine curing agent commercially available from Air Products and Chemicals, Inc.

In Example 1, all of the ingredients were combined in the presence of a nitrogen gas blanket. In Example 1, the ingredients of Part A were combined under agitation according to the order reflected in Table 1. Once all of the ingredients were combined, the ingredients were agitated at high speed using a cowles blade until a Hegman reading greater than 4.5 was achieved. Once this Hegman reading was achieved, the temperature of the blend was brought to approximately 120° F. (approximately 48.9° C.) and held for approximately 20 minutes while the ingredients were continuously agitated. Next, Part B was prepared by combining the ingredients under agitation in the order reflected in Table 1. Part B was added slowly to Part A under agitation. Part C was then prepared by combining the ingredients reflected in Table 1 under agitation. Then, Part C was added under agitation to the already combined blend of Parts A and B. Percent weight solids of Example 1 (theoretical) was approximately 76.9%. VOC (theoretical) was approximately 2.76 lbs. per gallon (approximately 330.7 grams/liter).

In Examples 2 through 5, the ingredients of Part A were combined under agitation according to the order reflected in Table 1 and mixed for approximately 20 minutes using a high-speed Cowles blade in a one-quart stainless steel vessel until a Hegman grind of 4 was obtained. Next, Part B was prepared by combining the ingredients under agitation in the order reflected in Table 1. Part B was added slowly to Part A under agitation. Part C was then prepared by combining the ingredients reflected in Table 1 under agitation. Then, Part C was added under agitation to the already combined blend of Parts A and B.

Viscosity was measured using a Stormer Viscometer on Examples 1 through 5 at ambient conditions. In addition, a sixth example (Example 6) was made, which mirrored the formulation of Example 1 but did not include the alkoxyfunctional silane (KR-401N). Results are reflected in Krebs Units in Table 2.

TABLE 2

| Duration | Example 1 | Example 2 | Example 3 | Example 4 | Example 5 | Example 6 |
|---|---|---|---|---|---|---|
| 24 hours | 76 KU | 65 KU | 82 KU | 65 KU | 60 KU | 80 KU |
| 1 month | — | Gelled | >130 KU | Gelled | Gelled | — |
| 1 year | 104 KU | — | — | — | — | 109 KU |

As Table 2 confirms, the introduction of the ketimine curing agent (EH-235RS) to the coating composition of Examples 1 and 6 increased the package stability as compared with samples (Examples 2-5) that did not include this ingredient.

Tables 3 and 4 below compares package stability, hardness, adhesion and corrosion resistance for various coatings compositions (Examples A, B, C and D). An explanation of each of the ingredients in the Composition is provided above under Table 1 and not repeated herein. In Examples A through D, the Aromatic 100, SB-1100 and Epon 1001-O-75 (if present) were charged to a one-quart can fitted and mixed at high speed until dissolved using a Cowles dissolver. Next, ingredients 4-10 (encompassing Antiterra U through the first charge of A171) were added sequentially while stirring. Once all of the ingredients were combined, the ingredients were mixed at high speed until a Hegman reading greater than 3 was achieved. Once this Hegman reading was achieved, the temperature of the blend was brought to approximately 120° F., wherein the remaining ingredients were added. The resultant batch was mixed until uniform.

TABLE 3

| Composition | Example A | Example B | Example C | Example D |
|---|---|---|---|---|
| Aromatic 100[17] | 111.2 | 111.2 | 111.2 | 111.2 |
| SB-1100[10] | 69.4 | 0 | 0 | 69.4 |
| Epon 1001-O-75[1] | 290.3 | 290.3 | 290.3 | 290.3 |
| Antiterra U[2] | 9 | 9 | 9 | 9 |
| Suspeno 201[3] | 8.6 | 8.6 | 8.6 | 8.6 |
| KROMA RO-5097[4] | 59 | 59 | 59 | 59 |
| Bartex 65[6] | 211.13 | 211.13 | 211.13 | 211 |
| Nytal 3300[5] | 240.9 | 240.9 | 240.9 | 240.9 |
| Bentone SD-2[7] | 2 | 2 | 2 | 2 |
| A171[8] | 10.3 | 10.3 | 10.3 | 30.3 |
| Methyl Ethyl Ketone | 67.2 | 67.2 | 67.2 | 67.2 |
| A171[8] | 33.8 | 33.8 | 33.8 | 33.8 |
| EH-235 RS-A[12] | 58.6 | 58.6 | 58.6 | 58 |
| KR-401N[11] | 23.8 | 0 | 23.8 | 0 |

[17]Solvent (hydrocarbon fluid) commercially available from Exxon Mobile Chemical.

TABLE 4

| Test | Example A | Example B | Example C | Example D |
|---|---|---|---|---|
| 1 Day Package Stability[18] | 76 | 65 | 60 | 68 |
| 7 Day Package Stability[18] | 80 | 77 | 75 | 79 |
| 28 Day Package Stability[18] | 83 | | 84 | |
| 35 Day Package Stability[18] | | 90 | | |
| 60 Day Package Stability[18] | 90 | 130+ | 124 | 95 |
| Dry Hard Time at 72° F.[19] | 8 hrs. | 12 hrs. | 12 hrs. | 8 hrs. |
| Konig Hardness - 7 days[20] | 12 | 7 | 7 | 10 |
| Konig Hardness - 30 days[20] | 55 | 25 | 35 | 40 |
| Adhesion to Steel, Crosshatch[21] | 5 | 3 | 4 | 4 |
| Xylene Double Rubs, 7 Day Cure | 8 | 6 | 8 | 8 |
| Blistering[22] | none | f#8 | f#8 | none |
| Rusting[22] | none | none | none | none |

[18]Package Stability measured in Krebs Units at 120 degrees Fahrenheit using a Stormer Viscometer in accordance with ASTM D562.
[19]The Dry Hard Time Test was performed in accordance ASTM D1640.
[20]Konig Hardness Test was performed in accordance with ASTM D4366
[21]The Adhesion to Steel Test was performed in accordance ASTM D3359.
[22]The Blistering and Rusting Tests were performed in accordance with ASTM 4585 (Cleveland Humidity, 506 DFT, 1000 hours). Blister ratings were evaluated in accordance with ASTM D714 and Rust Ratings were evaluated in accordance with ASTM D1654. Coating applied at 6 mils DFT on a sandblasted test panel.

As Table 4 confirms, the addition of both the hydrocarbon resin (SB-1100) and the alkoxy-functional silicone resin (KR-401N) to the coating composition achieved the highest package stability as compared with samples including either ingredient alone or neither ingredient. Further, Table 4 confirms that coated substrates having both the hydrocarbon resin and the alkoxy-functional silicone resin in its coating exhibited increased hardness, adhesion and corrosion resistance as compared with coated substrates having a coating including either ingredient alone or neither ingredient.

Tables 5 and 6 below compare for coatings compositions for one exemplary formulation with and without a moisture scavenger (Examples E, and F, respectively).

In Examples E and F, the Aromatic 150, SB-1100 and Epon 1001-O-75 were charged to a one-quart can fitted and mixed at high speed until dissolved using a Cowles dissolver. Next, ingredients 4-11 (encompassing Antiterra U through the PTSI moisture scavenger) were added sequentially while stirring. Once all of the ingredients were combined, the ingredients were mixed at high speed for about 15-20 minutes until a Hegman reading greater than 4.5 was achieved. Once this Hegman reading was achieved, the temperature of the blend was brought to approximately 120° F., wherein the remaining ingredients were added. The resultant batch was mixed until uniform.

TABLE 5

| Composition | Example E | Example F |
| --- | --- | --- |
| Aromatic 150[9] | 96.5 | 96.5 |
| SB-1100[10] | 60.3 | 60.3 |
| Epon 1001-O-75[1] | 252.3 | 252.3 |
| Antiterra U[2] | 7.8 | 7.8 |
| Suspeno 201[3] | 7.5 | 7.5 |
| Tioxide TR-93[23] | 296.9 | 296.9 |
| Nicron 403 Talc[24] | 213.6 | 213.6 |
| Cimbar XF[25] | 187.7 | 187.7 |
| Xiameter ® OFS-6070[26] | 9.6 | 9.6 |
| Bentone SD-2[7] | 1.8 | 1.8 |
| PTSI[27] | 1 | |
| Methyl Ethyl Ketone | 58.5 | 67.2 |
| OFS-6070[26] | 28.2 | |
| KR-401N[11] | 20.7 | 58.6 |
| EH-235 RS-A[12] | 51 | 51 |
| Additive OF[28] | 1 | |
| OFS-6070[26] | 37.7 | |

[23]Titanium dioxide pigment available from Huntsmen Chemical of The Woodlands, Texas.
[24]Talc available from Rio Tinto PLC of London, England..
[25]Barium Sulfate available from Cimbar of Cartersville, Georgia.
[26]Methyltrimethoxysilane available from Dow Corning Corporation of Midland, Michigan.
[27]p-Toluenesulfonyl Isocyanate available from Van DeMark Chemical of Lockport, New York.
[28]Tetraethylorthoformate available from Bayer Corp. of Pittsburgh, Pennsylvania.

TABLE 6

| Test | Example E | Example F |
| --- | --- | --- |
| Weight Per Gallon (lbs./gallon) | 13.3 | |
| 1 Day Package Stability[18] | 85 | 85 |
| 3 Week Package Stability[18] | | 125 |
| 12 Week Package Stability[18] | 87 | |
| 1 Year Package Stability[18] | 102 | |
| Leneta Sag Resistance[29] | 15 mils | |
| Dry To Touch Time, 8 mils wet[30] | 2 hrs. | |
| Dry Hard Time. 8 mils wet[19] | 8 hrs. | |
| Water Immersion at 180° F.[31] | No blistering, rusting, or other coatings defects after 2 months | |
| Konig Hardness - 9 days[20] | 19 | |
| Konig Hardness - 2 Months[20] | 52 | |
| Adhesion to Steel, Crosshatch[21] | 8 | |
| Salt Fog Resistance[32] | No blistering, no rusting, ⅛ inch scribe creep | |
| Blistering[22] | 10 | |
| Rusting[22] | 10 | |
| Topcoat Adhesion (One Pack Epoxy Primer(5 mils)/Aliphatic Polyurethane (2 mils)[33] | Excellent Adhesion 2 Months Between Coats | Adhesion poor after 1 week |
| Topcoat Adhesion (One Pack Epoxy Primer(5 mils)/Acrylic Siloxane (2 mils)[33] | Excellent Adhesion 2 Months Between Coats | Adhesion poor after 1 week |

[29]Luneta Sag Resistance test in done in accordance with ASTM D4400.
[30]The Dry To Touch Test was performed in accordance ASTM D1640.
[31]The Water Immersion Test is done in accordance with ASTM D870.
[32]Salt Fog Resistance for 1000 hours in accordance with ASTM B-117.
[33]The topcoats listed (either the Aliphatic Polyurethane Topcoat or the Acrylic Siloxane Topcoat) were applied to a substrate material previously coated with the one-pack epoxy primer (either Example E or Example F) and evaluated for adhesion.

As Tables 5 and 6 confirm, the addition of the moisture scavenging agents to the formulation of one exemplary embodiment (Example E) improved long-term package stability and viscosity over the formulation without these moisture scavenging agents (Example F). Further, the exemplary embodiment including these moisture scavenging agents (Example E) exhibited high package stability, good dry to touch and dry to hard times, good hardness, good weatherability (in terms of salt fog resistance, water immersion, and adhesion) as well as good adhesion to subsequently applied topcoats. In addition, Tables 5 and 6 confirm that the addition of these moisture scavenging agents in a one pack epoxy primer (i.e. Example E) may extend the time period for subsequently applying topcoats and achieving excellent adhesion as compared with one pack epoxy primers without any moisture scavenging agents (i.e. Example F).

It will be appreciated by those skilled in the art that changes could be made to the embodiments described above without departing from the broad inventive concept thereof. Whereas particular embodiments of this invention have been described above for purposes of illustration, it will be evident to those skilled in the art that numerous variations of the details of the present invention may be made without departing from the invention as defined in the appended claims.

What is claimed is:

1. A high solids, one-component, storage stable coating composition comprising:
    (a) an epoxy resin comprising more than one 1,2 epoxy groups per molecule;
    (b) a hydrocarbon compound having a softening point of from 50° C. to 140° C.;
    (c) an alkoxy-functional and/or silanol functional silicone comprising a compound represented by the general formula:

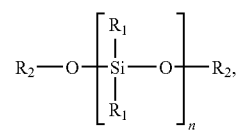

wherein:
    (i) each $R_1$ is independently selected from the group consisting of a hydroxy group, an alkyl group having up to six carbon atoms, an aryl group having up to six carbon atoms, and an alkoxy group having up to six carbon atoms;

(ii) each $R_2$ is independently selected from the group consisting of a hydrogen, an alkyl group having up to six carbon atoms, and an aryl group having up to six carbon atoms; and (iii) n is selected so that the silicone has a weight average molecular weight in the range of from 400 to 10,000; and (d) a ketimine curing agent comprising a reaction product of reactants comprising a polyalkyldiamine component and a ketone component.

2. The coating composition of claim 1, wherein said polyalkyldiamine component comprises a polyoxyalkyldiamine component.

3. The coating composition of claim 2, wherein said polyoxyalkyldiamine component comprises a polyoxypropylenediamine component.

4. The coating composition of claim 3, wherein the polyoxypropylenediamine component of the ketimine curing agent comprises a blend of polyoxypropylenediamine having a molecular weight of 200 to 500 and polyoxypropylenediamine having a molecular weight of 1,000 to 3,000 at a weight ratio of 9:1 to 6:4.

5. The coating composition of claim 1, wherein the epoxy resin comprises at least one polymer chosen from epichlorohydrin-bisphenol A epoxy resins, epichlorohydrin bisphenol F epoxy resins, hydrogenated bisphenol A epichlorohydrin epoxy resins, glycidyl methacrylate resins, glycidyl esters, phenol novalac epoxy resins, and resorcinol-modified epoxy resins.

6. The coating composition of claim 1, wherein the hydrocarbon compound comprises at least one polymer chosen from coumarone-indene resins, terpene resins, ketone resins, aliphatic hydrocarbon resins, and aromatic hydrocarbon resins.

7. The coating composition of claim 1, wherein the alkoxy-functional and/or silanol-functional silicone is alkoxy-functional and has an alkoxy content from 10 to 30 percent by weight based on the total weight of the silicone.

8. The coating composition of claim 1, wherein the ketone component of the ketimine curing agent comprises methyl isobutyl ketone.

9. The coating composition of claim 1, wherein the ketamine curing agent has a degree of ketimination of 90% or higher.

10. The coating composition of claim 1, wherein the reaction product of component (d) further comprises a catalyst selected from the group consisting of tertiary amines, phenols, and organometallic catalysts.

11. The coating composition of claim 1, comprising:
5 to 80 percent by weight of component (a);
1 to 50 percent by weight of component (b);
0.1 to 35 percent by weight of component (c); and
1 to 30 percent by weight of component (d).

12. The coating composition of claim 1, further comprising a moisture scavenger.

13. The coating composition of claim 1, further comprising another polyalkyldiamine component different from said polyalkyldiamine component.

14. The coating composition of claim 1, further comprising an aldimine curing agent.

15. The coating composition of claim 1, further comprising an epoxy-functional resin different from said epoxy resin, said epoxy-functional resin comprising at least one polymer chosen from epoxy-functional acrylic resins, epoxy-functional silane resins and epoxy-functional silicones.

16. A substrate at least partially coated with a coating deposited from the coating composition of claim 1.

17. A method of applying a multi-layer coating to a substrate comprising:

(a) applying a first coating layer over at least a portion of a substrate, wherein the first coating layer is deposited from the coating composition of claim 1; and (b) applying a second coating layer over at least a portion of the first coating layer.

18. The method of claim 17, wherein the second coating layer is deposited from a basecoat and/or topcoat coating composition.

19. The method of claim 17, further comprising (c) applying a third coating layer over at least a portion of the second coating layer, wherein the third coating layer is deposited from a substantially clear coating composition.

* * * * *